US009328967B2

(12) United States Patent
Kelley

(10) Patent No.: US 9,328,967 B2
(45) Date of Patent: May 3, 2016

(54) ELONGATED COUNTER-FLOW HEAT EXCHANGER FOR HEAT RECOVERY

(76) Inventor: William A Kelley, Austin, TX (US)

( * ) Notice: Subject to any disclaimer, the term of this patent is extended or adjusted under 35 U.S.C. 154(b) by 1002 days.

(21) Appl. No.: 13/073,798

(22) Filed: Mar. 28, 2011

(65) Prior Publication Data

US 2012/0247734 A1    Oct. 4, 2012

(51) Int. Cl.
| | | |
|---|---|---|
| *F28D 7/14* | (2006.01) | |
| *F28D 7/00* | (2006.01) | |
| *F28D 21/00* | (2006.01) | |
| *F28F 1/36* | (2006.01) | |
| *F24H 1/00* | (2006.01) | |
| *F22B 29/06* | (2006.01) | |
| *F23J 15/06* | (2006.01) | |
| *F24H 8/00* | (2006.01) | |

(52) U.S. Cl.
CPC . *F28D 7/14* (2013.01); *F22B 29/06* (2013.01); *F24H 1/009* (2013.01); *F28D 7/0066* (2013.01); *F28D 21/0003* (2013.01); *F28F 1/36* (2013.01); *F23J 15/06* (2013.01); *F24D 2200/18* (2013.01); *F24D 2200/26* (2013.01); *F24H 8/00* (2013.01); *Y02B 30/102* (2013.01); *Y10T 29/53113* (2015.01)

(58) Field of Classification Search
CPC ....... F28D 7/0066; F28D 7/01; F28D 21/003; F28D 2200/18; F28D 2200/26; F24H 1/009; F24H 8/00; F22B 29/06; F28F 1/36; F23J 15/06; Y02B 30/102; Y10T 29/53113
USPC ...................................... 165/10, 41
See application file for complete search history.

(56) References Cited

U.S. PATENT DOCUMENTS

| | | | | |
|---|---|---|---|---|
| 2010/0147486 | A1* | 6/2010 | Vetrovec | F28D 20/02 165/10 |
| 2010/0276121 | A1* | 11/2010 | Sagie | F28D 7/1607 165/110 |

* cited by examiner

*Primary Examiner* — Ljiljana Ciric

(57) ABSTRACT

A design and manufacturing technique for a "Long Heat Exchanger", a counter-flow heat exchanger transfer up to 100% of heat and temperature between two fluids (gas or liquid). Inner "Core" of heat conductive material capable of manufacture in continuous lengths, may be coiled, cut and formed to shape. 100% of conductive material making up core is a heat transfer surface, allowing minimum material design for chosen transfer efficiency. "Core" has integral fins allowing overall device to be bent in a radius without deforming. Outer channel volume and core fins surface area may be sized to match different density fluids.

20 Claims, 6 Drawing Sheets

FIGURE 1
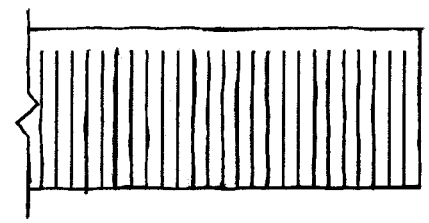
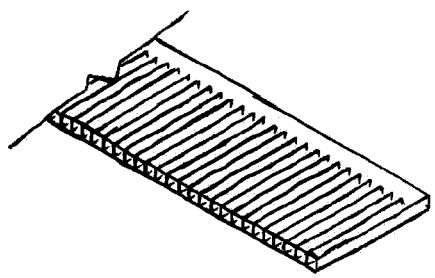
FABRICATE CUTS IN METAL STRIP
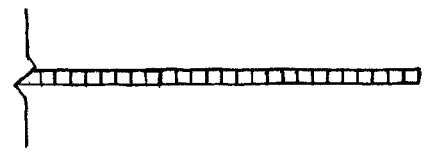
FIGURE 2
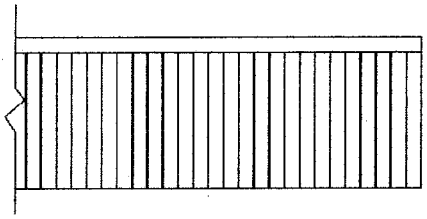
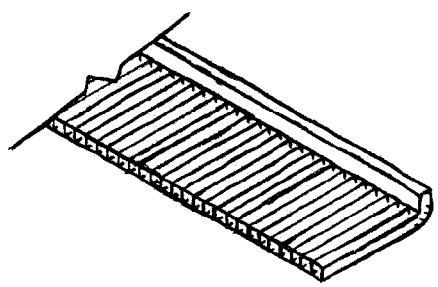
RIGHT ANGLE BEND
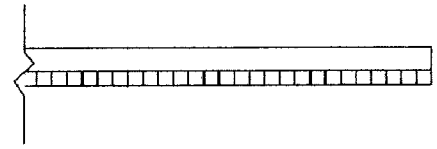

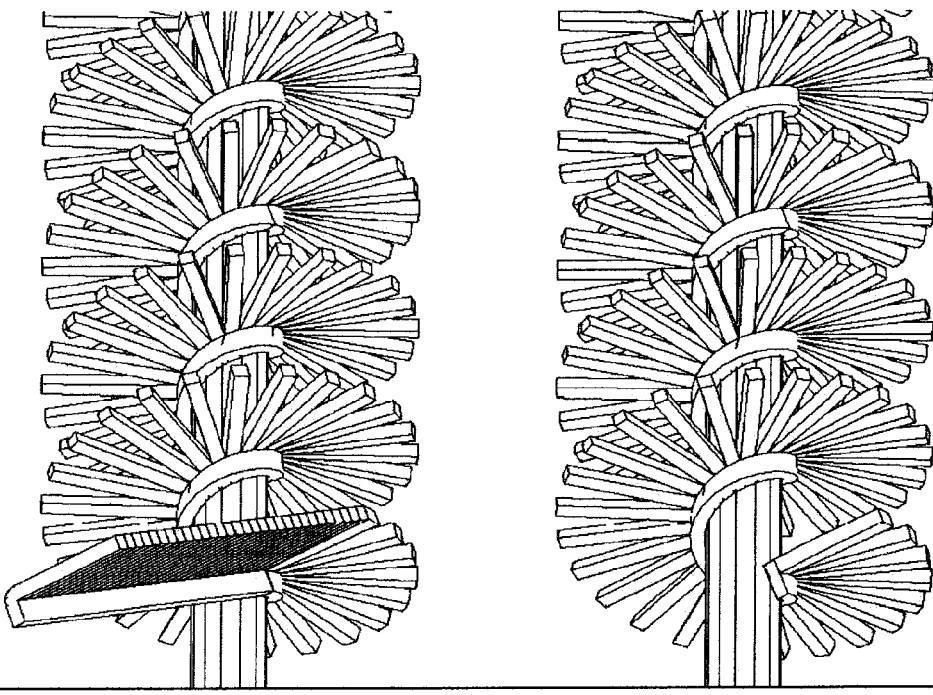
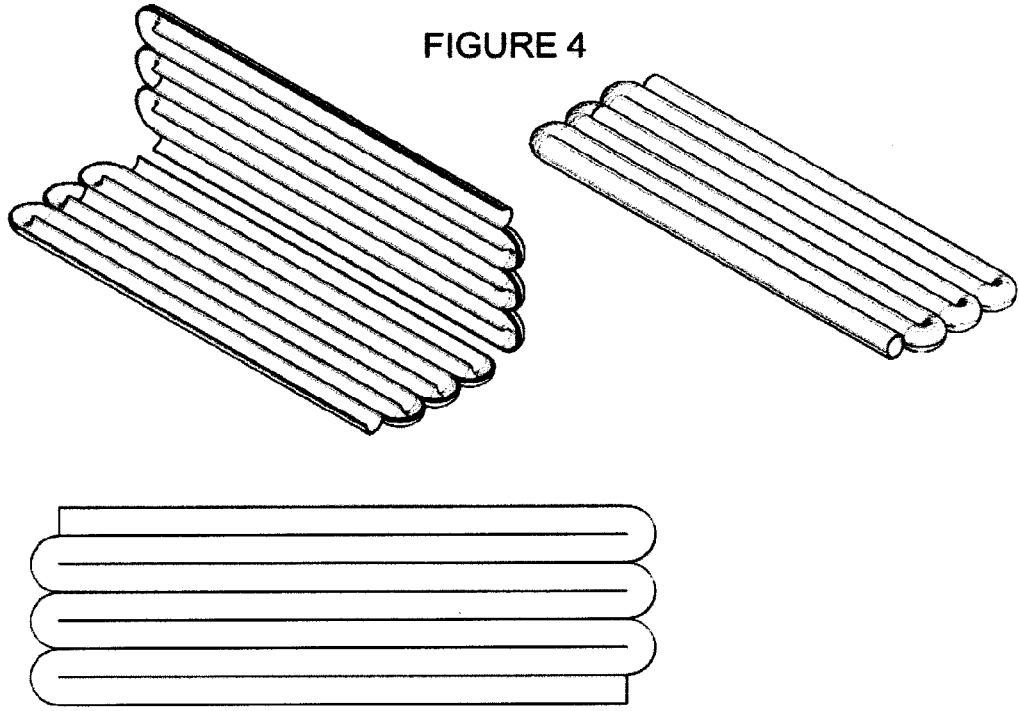

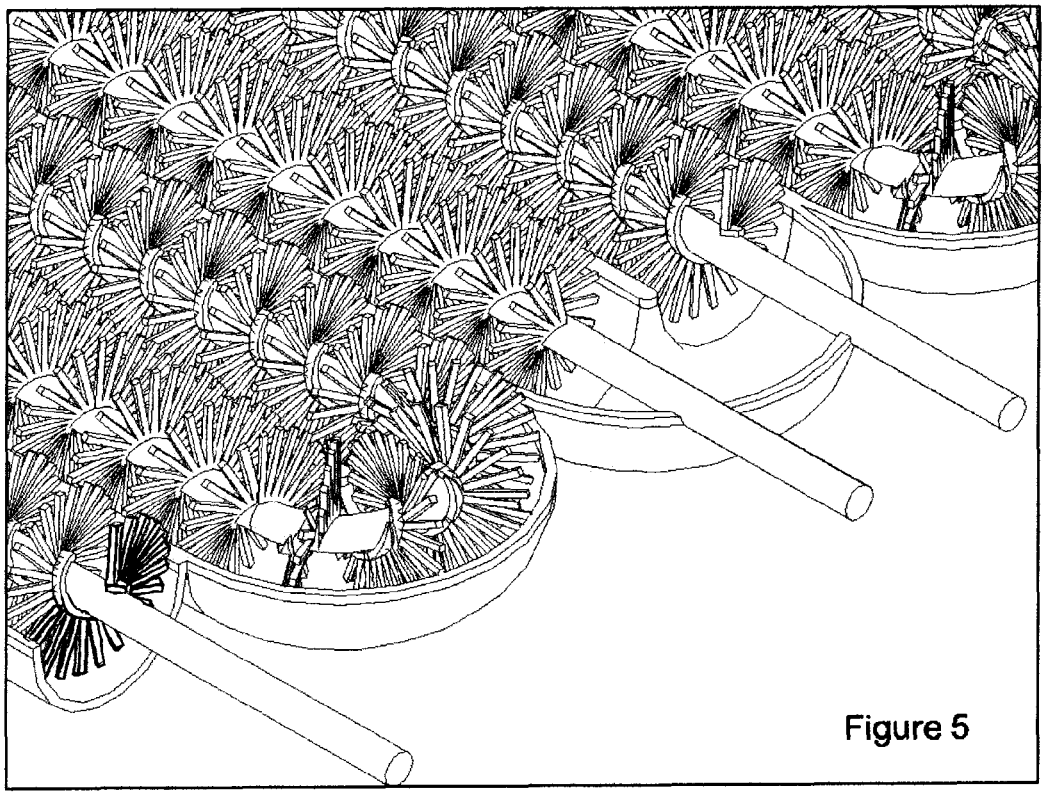
Figure 5
Figure 6
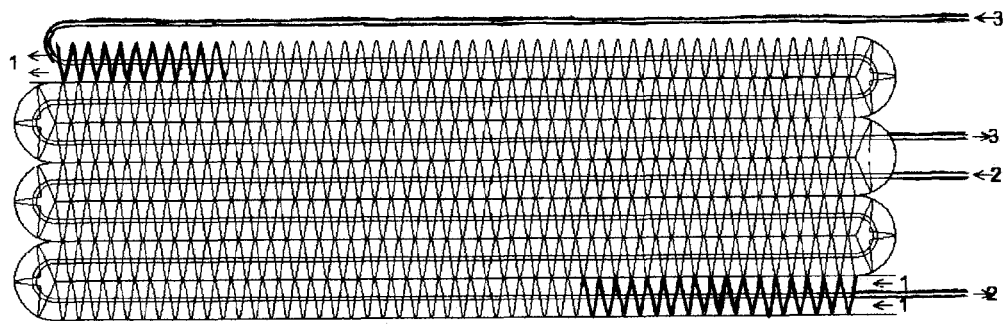

ELONGATED COUNTER-FLOW HEAT EXCHANGER FOR HEAT RECOVERY

CROSS-REFERENCE TO RELATED APPLICATIONS

There are no prior or referenced applications or patents.

STATEMENT REGARDING FEDERALLY SPONSORED RESEARCH AND DEVELOPMENT

This patent is not federally sponsored.

REFERENCE TO SEQUENCE LISTING, A TABLE, OR A COMPUTER PROGRAM LISTING COMPACT DISC APPENDIX

Not applicable.

BACKGROUND OF THE INVENTION

The invention relates to recovery of all heat of exhaust from an internal combustion engine, such as automotive or external combustion engine, exhaust from combustion heating, including boiler, water heater, space heater, flues or chimneys, or exhaust from steam turbine or other steam driven process.

In all combustion driven heat engines (thermodynamic engines), steam driven heat engines (state change heat engines), and combustion driven heating processes, both a fluid material (usually a gas) and heat are exhausted. Heat represents the loss or inefficiency of the whole process. The heat can be completely reclaimed by this device. Applying the recycled heat to the same or other process represents a fuel savings.

BRIEF SUMMARY OF THE INVENTION

There are two basic types of heat exchangers, the conventional or "radiator" type, and counter-flow heat exchangers. Conventional heat exchangers are more efficient in many applications, but cannot completely transfer all the heat between two materials. A sufficiently elongated counter-flow heat exchanger is able to transfer up to 100% of the heat between two fluids, with temperature loss approaching zero. Consequently, elongated counter-flow heat exchangers are viable choice if an application goal is to approach 100% energy conversion efficiency, while conventional heat exchanger cannot.

For the purpose here a "Elongated Heat Exchanger" is defined as a counter-flow heat exchanger, with a Main channel (preferably constructed of a thermally insulating material) through which a fluid (liquid or gas) flows. The purpose being to exchange heat and temperature with a working fluid flowing in the opposite direction. A second fluid flows in the opposite direction through smaller Core channels with heat conducting fins. The entire Core is constructed of a heat conducting material. There may be one or more Core channels inside the Main channel to facilitate flow and heat transfer efficiency. The length, diameter, materials and layout of the Main and Core channels may be chosen to approach 100% heat transfer and approach zero temperature loss. The Core channels may be subdivided into segments to facilitate pressure isolation.

The low cost construction method is automatable and makes use of inexpensive materials. Cores can be made and handled similarly to conventional metal tubing, made in continuous or arbitrary lengths, coiled for shipment, formed during manufacture, and connected via same methods. Standardized subcomponents can allow Elongated Heat Exchangers to be manufactured more cheaply than for example car radiators which are custom made for each size. Main Channels usually require much lower pressure capacity than the Core channels. Consequently Main Channel housing have more flexibility in shape, material and construction. Main channel may be monolithic, formed into two halves (clam shell) or multipart, may be injection molded, brick, clay or any conventional material used to carry exhaust. Existing structures, such as chimneys or flues, may serve as Main Channel, so the heat exchanger heat conductive Core channel (tubing with radial fins) technology is suitable for retrofit.

BRIEF DESCRIPTION OF THE SEVERAL VIEWS OF THE DRAWING

Construction begins with metal tubing and sheet metal strip of the same heat conducting material.

FIG. 1) The continuous metal strip is first cut to form "fins". Top, Front, End and Diagonal views.

FIG. 2) The metal strip is bent at right angle. Top, Front, End and Diagonal views.

FIG. 3) The metal strip is bonded in a spiral around tubing, to create a 3 dimensional spread of heat conducting fin material with a central conduit (tubing) for the heat gathering working fluid. This sub assembly forms the heat exchanger "Core".

FIG. 4) An example of a compact application, such as automotive. Main Heat Exchanger Channel is formed in two halves, to house a heat exchanger Core channel which is formed to fit. A single Core follows the channel. Core fluid (such as air) flows in opposite direction of Main channel fluid (such as engine exhaust).

FIG. 5) Close-up of Core in channel.

FIG. 6) Overview of extended channel, with two separate Core segments in series. Applications may have multiple Core channels in series or parallel to fit exhaust space and to allow pressure isolation. FIG. 6-#1 labels direction of exhaust flow. FIG. 6-#2 shows direction of working fluid is opposite direction of exhaust flow.

FIG. 7-#1 labels direction of exhaust flow. FIG. 7-#2 shows direction of working fluid is opposite direction of exhaust flow.

FIG. 8-#2 Exhaust still channeled to vehicle rear. FIG. 8-#3 Relative engine position.

FIG. 10-#1 labels direction of exhaust flow. FIG. 10-#2 shows direction of working fluid is opposite direction of exhaust flow.

FIG. 11-#1 labels direction of exhaust steam flow. FIG. 11-#2 shows direction of working fluid (water) is opposite direction of exhaust steam flow. FIG. 11-#3 condensation return to FIG. 11-#4 water reservoir. FIG. 11-#5 pressure isolation, connected mechanically FIG. 11-#7. FIG. 11-#6, boiler/steam turbine exhausts steam to Main channel.

DETAILED DESCRIPTION OF THE INVENTION

Materials need to be selected for cost, heat and chemical environment. Aluminum and copper are appropriate for most applications. Stainless steel can be used for higher temperature or chemical conditions that would corrode cheaper materials. This forms the elongated heat exchanger Core.

The exhaust conduit should be of thermal insulating material, also selected for cost, heat and chemical properties. Ceramic materials can handle high heat, insulate better than metals, and have high corrosion resistance.

Figure 7:
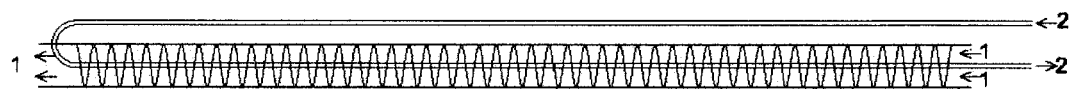
FIG. 7) Simple single Main exhaust channel with Core channel. As in a direct replacement for an exhaust pipe.
Figure 8:
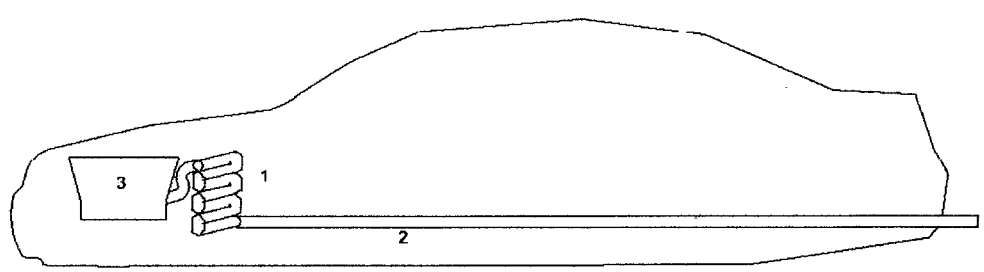
FIG. 8) Small folded Main channel heat exchanger unit FIG. 8-#1 in engine compartment.
Figure 9:
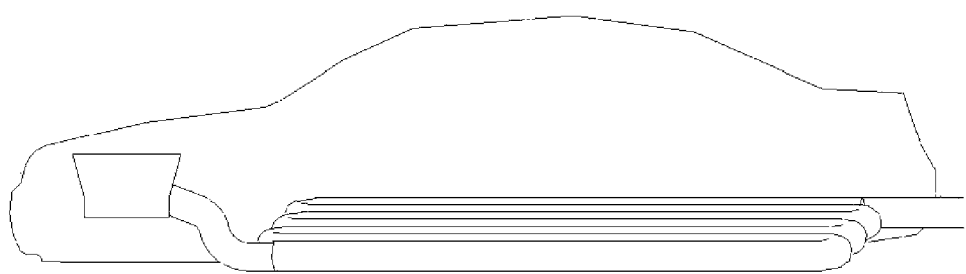
FIG. 9) #1 A large folded Main channel heat exchanger extending length of undercarriage, as current automotive exhaust systems do.
Figure 10:
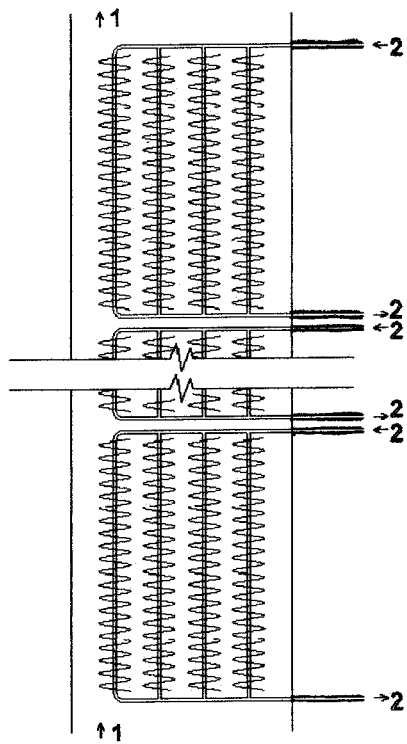
FIG. 10) Block diagram represents vertical chimney. Building heating or equipment elongated heat exchanger Core channels insert into chimney or flue. Multiple parallel Core channels fill cross section, multiple series Core channels segments to isolate pressure differences.
Figure 11:
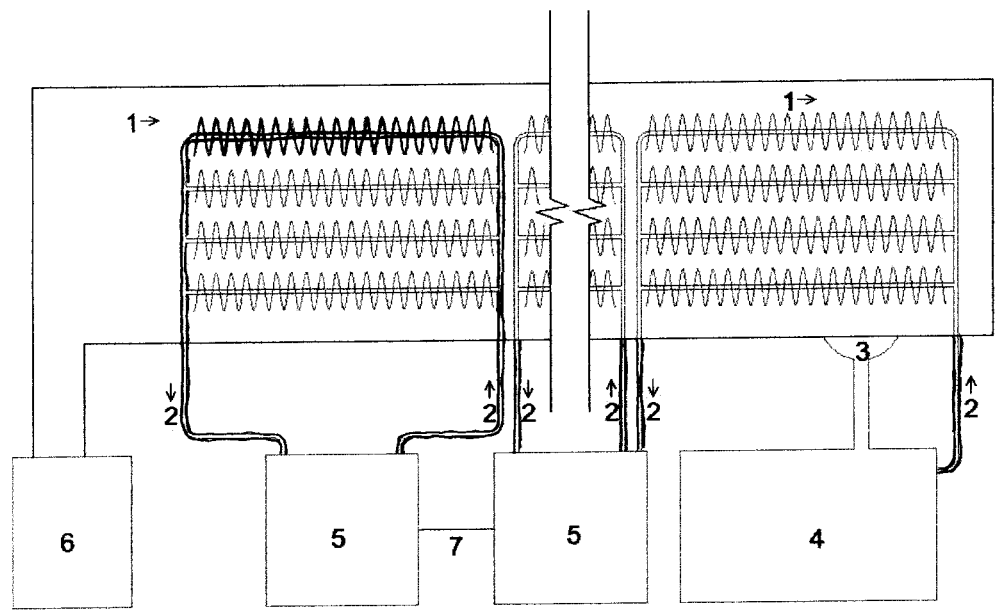
FIG. 11) Example of application in closed steam generator system. Steam condenses out, becoming working fluid for counter-flow.

Applications such as automotive require space saving construction. A folded channel is ideal. In order to fabricate, inspect and service the product, the exhaust conduit is formed in two halves, to be assembled around the metal heat exchanger Core. The channel diameter is sized to be slightly larger than existing applications exhaust channel, to accommodate equivalent exhaust flow in the presence of the heat exchanger Core and longer Main channel length. The Main channel may be folded on itself, as in FIGS. 4, 5 & 6, to provide sufficient length to achieve desired heat recovery (such as 90%). FIGS. 8 and 9 show examples of sizing the exhaust channel to fit the application, such as a small automotive heat exchanger in the engine compartment or large automotive heat exchanger spanning the vehicle undercarriage, as current automotive exhaust systems do.

Fully assembled unit may include multiple unconnected segments of heat exchanger Core channel. Pressure isolation is necessary for many fluid heating applications and application in heat engines. The working fluid in each section will become progressively higher temperatures from entry until exit on end closest to heat source. Operating temperatures in different sections may differ enough to allow cheaper materials (aluminum) in relatively lower temperature segments and only use more costly materials that are more heat or chemically resilient materials (stainless steel) in higher temperature or more chemically reactive segments.

Large exhaust channels such as flues or chimneys may have multiple parallel heat exchanger Cores to fill pace and maintain sufficient working fluid surface area for efficient heat transfer. An example would be a steam turbine exhaust, in which working fluid is the water from re-condensed steam, enabling a closed system. The steam exhaust would be condensed by the device into a reservoir. The reservoir is the source for the working fluid (water) moving in the opposite direction, so effectively near 100% of the waste heat is recycled for a resulting fuel savings.

Other exhaust gasses will typically be cooled to approximately ambient. More specifically, gasses can be cooled to the temperature of the incoming working fluid. An ideal automotive application will exhaust gasses at about ambient temperature, even at maximum engine output. Factory or electric generation applications can be similarly made that exhaust little or no heat to the environment.

The invention claimed is:

1. An elongated counter-flow heat exchanger for heat recovery, the counter-flow heat exchanger comprising:
   a clam shell formed in two halves and forming a main channel, the main channel including at least one inlet and at least one outlet; and,
   at least one length of tubing made of a thermally conductive material and forming at least one corresponding core channel, the at least one length of tubing folded into a serpentine shape formed to fit the main channel and disposed within the main channel; and,
   a strip made of the same thermally conductive material cut to form fins and bonded in a spiral around each of the at least one length of tubing.

2. The counter-flow heat exchanger of claim 1, wherein the claim shell is constructed of a thermally insulating material selected from the group consisting of brick, clay or another ceramic material.

3. The counter-flow heat exchanger of claim 2, wherein the thermally insulating material is injection molded.

4. The counter-flow heat exchanger of claim 1, wherein the main channel is folded onto itself to provide sufficient length to achieve a desired heat recovery.

5. The counter-flow heat exchanger of claim 1, wherein the thermally conductive material is a metallic material.

6. The counter-flow heat exchanger of claim 1, wherein the at least one length of tubing is continuous.

7. The counter-flow heat exchanger of claim 1, wherein the at least one length of tubing includes plural segments, with at least one segment being made of a different thermally conductive material.

8. The counter-flow heat exchanger of claim 7, wherein the thermally conductive material is stainless steel and wherein the different thermally conductive material is aluminum.

9. The counter-flow heat exchanger of claim 1, wherein the at least one length of tubing and the corresponding strip bonded thereon form a single heat exchanger core subassembly.

10. The counter-flow heat exchanger of claim 1, wherein the at least one length of tubing and the corresponding strip bonded thereon form plural parallel heat exchanger cores.

11. An elongated counter-flow heat exchanger for heat recovery, the counter-flow heat exchanger comprising:
    a monolithic main channel constructed of a thermally insulating material, the main channel including at least one inlet and at least one outlet; and,
    at least one length of tubing made of a thermally conductive material and forming at least one corresponding core channel, the at least one length of tubing folded into a serpentine shape formed to fit the main channel and disposed within the main channel; and,
    a strip made of the same thermally conductive material cut to form fins and bonded in a spiral around each of the at least one length of tubing.

12. The counter-flow heat exchanger of claim 11, wherein the thermally insulating material is injection molded.

13. The counter-flow heat exchanger of claim 11, wherein the thermally insulating material is selected from the group consisting of brick, clay, or another ceramic material.

14. The counter-flow heat exchanger of claim 11, wherein the main channel is folded onto itself to provide sufficient length to achieve a desired heat recovery.

15. The counter-flow heat exchanger of claim 11, wherein the thermally conductive material is a metallic material.

16. The counter-flow heat exchanger of claim 11, wherein the at least one length of tubing includes plural segments, with at least one segment being made of a different thermally conductive material.

17. The counter-flow heat exchanger of claim 16, wherein the thermally conductive material is stainless steel and wherein the different thermally conductive material is aluminum.

18. The counter-flow heat exchanger of claim 11, wherein the at least one length of tubing and the corresponding strip bonded thereon form a single heat exchanger core subassembly.

19. The counter-flow heat exchanger of claim 11, wherein the at least one length of tubing and the corresponding strip bonded thereon form plural parallel heat exchanger cores.

20. The counter-flow heat exchanger of claim 11, wherein the at least one corresponding core channel includes multiple parallel heat exchanger cores.

* * * * *